United States Patent
Zhu et al.

(10) Patent No.: US 10,024,689 B2
(45) Date of Patent: Jul. 17, 2018

(54) USING MAGNETS TO DETECT A STATE OF A COVER

(71) Applicant: Apple Inc., Cupertino, CA (US)

(72) Inventors: Hao Zhu, San Jose, CA (US); John C. DiFonzo, Emerald Hills, CA (US); Guangtao Zhang, San Francisco, CA (US); Rizal Johari, Santa Clara, CA (US); Samuel Gilkison Smith, Cupertino, CA (US); Sean S. Corbin, San Jose, CA (US); Erik A. Uttermann, Cupertino, CA (US)

(73) Assignee: Apple Inc., Cupertino, CA (US)

(*) Notice: Subject to any disclaimer, the term of this patent is extended or adjusted under 35 U.S.C. 154(b) by 538 days.

(21) Appl. No.: 14/857,544

(22) Filed: Sep. 17, 2015

(65) Prior Publication Data

US 2017/0082458 A1 Mar. 23, 2017

(51) Int. Cl.
*G06F 1/16* (2006.01)
*G01D 5/14* (2006.01)

(52) U.S. Cl.
CPC .................... *G01D 5/145* (2013.01)

(58) Field of Classification Search
USPC .................................................. 361/679.26
See application file for complete search history.

(56) References Cited

U.S. PATENT DOCUMENTS

| | | | |
|---|---|---|---|
| 6,044,473 A | 3/2000 | Kim | |
| 6,622,012 B2 | 9/2003 | Bilotti et al. | |
| 8,138,869 B1* | 3/2012 | Lauder | G06F 1/1613 |
| | | | 335/219 |
| 8,344,836 B2* | 1/2013 | Lauder | H01F 7/04 |
| | | | 206/320 |
| 9,773,598 B2* | 9/2017 | Lauder | H01F 7/0205 |
| 9,897,464 B2* | 2/2018 | Judkins, III | G01D 5/142 |
| 2004/0227407 A1* | 11/2004 | Nagai | G06F 1/1616 |
| | | | 307/112 |
| 2009/0051174 A1* | 2/2009 | Ho | E05C 1/10 |
| | | | 292/251.5 |
| 2010/0100202 A1 | 4/2010 | Chen et al. | |
| 2015/0061648 A1* | 3/2015 | Park | G01B 7/003 |
| | | | 324/207.2 |

\* cited by examiner

*Primary Examiner* — Rodney Fuller
(74) *Attorney, Agent, or Firm* — Dickinson Wright RLLP

(57) ABSTRACT

This application relates to devices that utilize magnets and associated magnetic sensors. A magnetic sensor can be positioned and oriented with respect to a magnetic element such that the magnetic sensor is capable of detecting a horizontal magnetic field component in contrast to the conventional paradigm of detecting a vertical magnetic field component. This can be accomplished by orienting a magnetically sensitive surface of the magnetic sensor about ninety degrees with respect to a magnetic vector of the magnetic element.

20 Claims, 13 Drawing Sheets

USING MAGNETS TO DETECT A STATE OF A COVER

FIELD

The described embodiments relate generally to magnetic detection. More particularly, the present embodiments relate to using a magnetic sensor in an electronic device to determine a relative position of magnetic element that is external to the electronic device.

BACKGROUND

Magnetic elements have been widely used in consumer electronic devices (such as iPad, tablets, smart phones, laptops, etc.) and their accessories to provide various unique functions. In order to utilize these magnets, magnetically sensitive sensors within an electronic device can be used to sense magnetic fields provided by the magnetic elements. The placement of the magnetic elements with respect to the magnetically sensitive sensors can be used to determine a relative position of an external magnetic element for example with respect to the electronic device. The relative position of the external magnetic element can, in turn, be used to alter an operation of the electronic device. For example, a strategically placed magnet when detected by an appropriately placed magnetically sensitive sensor can indicate that the electronic should be operable in a particular operating mode (such as sleep, wake, etc.).

SUMMARY

This paper describes various embodiments that relate to strategic placement of a magnetically sensitive circuit, such as a Hall Effect Sensor (HFX), within an electronic device such that the magnetically sensitive circuit can detect aspects of a magnetic field provided by a magnetic element that is located external to the electronic device.

An electronic device includes a housing having an external surface and a magnetic sensor carried by the housing and capable of detecting a magnetic field provided by a magnetic element in accordance with a magnetic detection axis that is generally parallel to the external surface. Based upon the detection of the magnetic field, the magnetic sensor provides a signal that the electronic device uses to identify that the external surface is between the magnetic sensor and the magnetic element.

A method operable by an electronic device having a housing with a first surface that is generally parallel to a second surface is carried out by performing at least the following operations: detecting a horizontal component of a magnetic field provided by a magnetic element by a magnetic sensor in accordance with a detection axis, the magnetic sensor being carried by the housing such that the detection axis is generally parallel to the first and second surfaces and perpendicular to an orientation of the magnetic element, the horizontal component comprising a horizontal component direction information and providing by the magnetic sensor in response to the detecting and the horizontal component direction information a signal that includes a first detection signal that identifies that the first surface is between the magnetic sensor and the magnetic element, otherwise, a second detection signal that identifies that the second surface is between the magnetic sensor and the magnetic element.

A consumer product system includes at least a tablet device having a housing arranged to carry operational components and having a full front opening and a protective cover disposed within the full front opening. The operational components include a magnetic sensor comprising an active portion for sensing a horizontal component of an external magnetic field generated by a magnetic element at a location that is external to the housing and providing a signal and a processor coupled to the magnetic sensor and operable to receive and process the signal provided by the magnetic sensor for determining a relative position of the external magnetic element with respect to the tablet device. The consumer product system also includes a protective cover having a single piece flap. The protective cover is capable of being releasably attached to the tablet device in a manner that allows the flap to pivotally move with respect to the tablet device.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
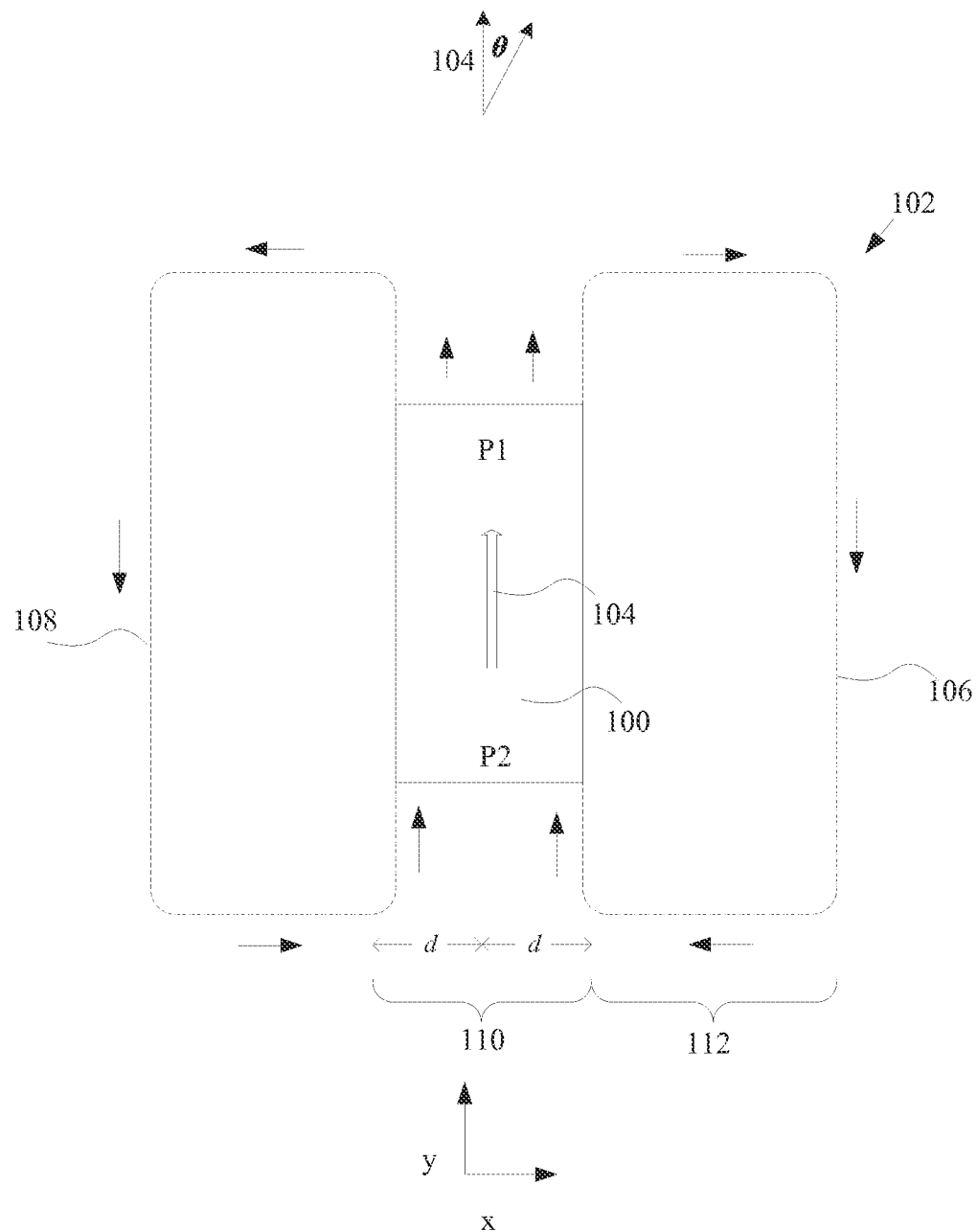
FIG. 1A shows a representation of a magnetic element and associated magnetic field in accordance with the described embodiments.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Magnetic elements and sensors for detection of magnetic elements have been used in consumer electronic products for many reasons. For example, laptop computers generally have a sleep/wake cycle that reduces power consumption when the laptop computer is not being used. Such a situation can occur when a lid of the laptop computer is closed with respect to a base unit pivotally coupled thereto. In this case, the laptop computer will generally transition from an active (or wake mode) to an inactive (or sleep) mode in order to preserve power (which is particularly important when the laptop computer is using an on-board battery for power). Generally, detection of the lid being closed upon the base unit is carried out by a magnetic element/sensor system in which either the lid or base unit includes a magnetic element that is detectable by a magnetic sensor. It should be noted that the magnetic sensor could take many forms, as there are magnetic sensors that use different physical effects to detect a magnetic field. For example, the magnetic sensor can take the form of a Hall effect sensor, or HFX sensor, that can detect a magnetic field by the effect that a component the magnetic field has on an electric charge moving in a plane normal to the magnetic field component. Other magnetic sensors can be sensitive to a component of the magnetic field in plane with the sensor rather than normal to the plane as with the previously mentioned Hall effect sensor. These in-plane type sensors can then be considered equivalent to rotating a Hall effect sensor. One such example of the in-plane type sensor is the magnetic resistance (MR) sensor type sensor that can include, anisotropic magneto-resistance (AMR) sensor, tunneling magneto-resistance (TMR) sensor, giant magneto-resistance (GMR) and so on. For the remainder of this discussion, however, and without loss of generality, the sensor in question will take the form of a Hall effect sensor (HFX). The detection of the magnetic element by the magnetic sensor causes the laptop computer to enter a sleep mode as long as the HFX continues to detect a presence of the magnetic element. In order to assure that the magnetic sensor does not 1) cause a false trigger by detecting spurious magnetic fields and 2) reliably detects the magnetic element, the magnetic sensor and the magnetic element are positioned in such a way that the magnetic sensor is exposed to a portion of the magnetic field generated by the magnetic element having the highest magnetic flux (I) density as possible. This positioning is achieved by placing the magnetic sensor directly in line with the magnetic element and more specifically directly aligned with one of the magnetic poles of the magnetic element providing the greatest amount of magnetic flux (I) density.

However, this arrangement between the magnetic element and the magnetic sensor requires a Z stack that as electronic devices become thinner becomes more problematic. This is particularly relevant to devices that can be used with accessory units having magnetic elements that are used by the electronic device to detect a state of the accessory unit. For example, an accessory unit can include a flap that can include a magnetic element that can be used by a paired electronic device to determine a number of conditions with regards to the flap. For example, one condition is the relative position of the flap with respect to the electronic device, such as a folded state (if the flap is foldable) of the flap, and so on. However, as electronic devices become thinner, the available space within a housing of the electronic device to carry a magnetic sensor that can adequately detect the magnetic element within the flap using the conventional paradigm becomes very problematic.

For example, the electronic device can take the form of a tablet computer or small handheld device having a display that covers a large portion of a front of the device. The accessory device can be releasably attached to the tablet device such that the flap can rotate 180° in a first direction towards the display and can rotate 180° in second direction opposite the first direction away from the display and come in contact with a rear portion of the tablet device. When magnetically coupled to the electronic device, the smooth rotation of the flap about the pivot line in the first direction can bring the flap in contact with the display whereas smooth rotation about the pivot line in the second direction can bring at least a portion of the flap in contact with a rear portion of the electronic device. The protective cover can overlay all or portions of the display depending upon a folded configuration. For example, in a first folded configuration, the protective cover can be folded in a manner that a portion of the display is uncovered and therefore viewable. The flap can be segmented by which it is meant that the flap can be divided into distinct portions that can fold and bend with respect to each other as well as the electronic device and in particular, the display. For example, one distinct portion of the flap can rotate about a hinge line with respect to another distinct portion of the flap. In this way, the segmented flap affords an additional option of revealing only specific portions of the display by folding individual segments to reveal a corresponding portion of the display while other segments remain in contact and therefore obscuring corresponding portions of the display. It is important, therefore, that any magnetic detection system be able to resolve the various folded configurations of the flap in order that the tablet computer operate appropriately.

Accordingly, the current embodiments describe a magnetic sensor/magnetic arrangement that avoids the problems associated with the conventional paradigm. Generally speaking, a magnetic sensor can detect a magnetic field in accordance with a detection axis and more particularly, the magnetic sensor is most sensitive to magnetic flux corresponding to magnetic field lines that are generally parallel to the detection axis. In the described embodiments, the magnetic element can be characterized as having magnetic vector that is generally parallel to a vertical magnetic field component and perpendicular to the horizontal magnetic field component. By orienting the magnetic sensor such that the detection axis is perpendicular to the magnetic vector, the magnetic sensor is capable of primarily detecting the horizontal magnetic field component. By laterally positioning the magnetic sensor away from magnetic element, the magnetic sensor can be essentially limited to detecting only that portion of the magnetic field corresponding to the horizontal magnetic field component that are generally parallel to the detection axis and little or none of the vertical magnetic field components.

One of the advantages to limiting the ability of the magnetic sensor to detect primarily the horizontal magnetic field component is related to the fact that the magnetic flux density associated with the horizontal magnetic field component varies substantially less than does the magnetic flux density associated with the vertical magnetic field component. Moreover, the relatively stability of the horizontal magnetic field component can provide substantial benefits over conventional magnetic sensor/magnetic element arrangements. Such benefits can include, for example, use of stronger magnets, ability to detect relative motion of the magnetic element with respect to the magnetic sensor, greater latitude in positioning the magnetic sensor within the housing providing a greater opportunity for system designers to optimize layouts (magnetic sensor can be surface mounted to a PCB, for example, avoiding using a flexible connector that can be very costly), false triggers can be avoided due to, for example, support surfaces formed of ferrous material that can act as a magnetic shunt resulting in a false trigger situation.

These and other embodiments are discussed below with reference to FIGS. 1-9; however, those skilled in the art will readily appreciate that the detailed description given herein with respect to these figures is for explanatory purposes only and should not be construed as limiting.

Figure 1B:
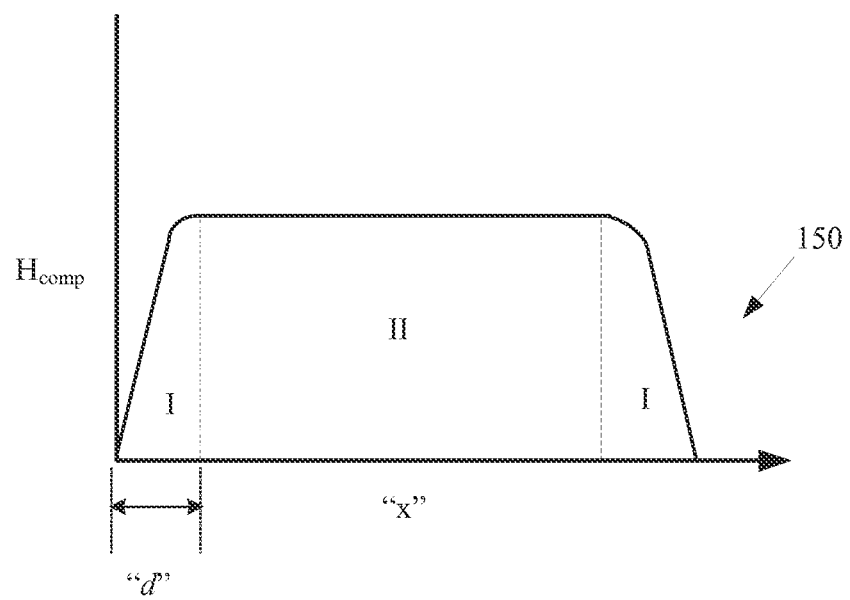
FIG. 1B shows a graphical representation of a relationship between a lateral distance from a magnetic element and magnetic field horizontal characteristics.

FIGS. 1A and 1B show a representation of magnetic element 100 and associated magnetic field 102 in accordance with the described embodiments. It should be noted that for simplicity, the conventional representation of a magnetic field having many field lines has been simplified to show a single field line. In this way, the concepts described herein can be more readily understood. It should also be noted that an interaction with magnetic field 102 can be represented in terms of a magnetic circuit. For example, when magnetic field 102 interacts with another magnetic field generated by another magnetic element, then it can be said that a magnetic circuit is formed between the two magnets having properties that reflect those of the magnetic interaction.

Turning to FIG. 1A, magnetic element 100 can take many forms such as a permanent bar magnet, an electromagnet, and so on. However, for sake of clarity and without loss of generality, magnetic element 100 will henceforth be considered a permanent magnet well suited for use in portable consumer products. For example, magnetic element 100 can be formed of a ferromagnetic material (such as iron) and magnetized to a desired polarity configuration. Magnetic element 100 can also be formed of, for example, a rare Earth element such as neodymium. Magnetic element 100 can take the form of a single magnet, a magnetic array, or a magnetic assembly composed of multiple magnets or a magnetized monolithic substrate. In any case, magnetic element 100 can be described in terms of a permanent bar magnet having a polarity $P_1$ and polarity $P_2$ that form magnetic field 102. In one embodiment, the "direction" of magnetic field 102 can be described in terms of magnetic vector 104. Magnetic vector 104 can, in turn, be used to provide a spatial orientation of magnetic element 100. In this way, magnetic element 100 can be characterized in a straightforward manner. For example, magnetic element 100 can be characterized in terms of a magnetic vector 104. Magnetic field lines 106 and 108 can be seen to "emerge" from a $P_1$ magnetic pole (magnetic source) in a direction that is essentially parallel to magnetic vector 104. Magnetic field lines 106 and 108 can therefore be described in terms of a vector quantity having both a magnitude and a direction which in this case is relative to magnetic vector 104. In the described embodiment, magnetic field lines 106 and 108 can each be associated with a magnetic field vector H. Magnetic field vector H can have both a magnitude corresponding to magnetic field strength H and a direction θ relative to magnetic vector 104. For example, magnetic field lines 106 and 108 at magnetic pole $P_1$ can have a magnetic field vector H associated with magnetic strength $H_1$ with a direction $θ_1$ where $θ_1$ is about 0° (i.e., essentially parallel to magnetic vector 104). It should be noted that due to symmetry considerations, magnetic field lines 106 and 108 "re-enter" magnetic element 100 at magnetic pole P2 (magnetic sink) having about the same magnetic field strength $H_1$ but a direction $θ_2$ that is 180° out of phase with direction $θ_1$.

In this regard, magnetic field 102 can be characterized has having both vertical and horizontal magnetic field components. For example, portion 110 of magnetic field 102 have magnetic field lines that are predominantly aligned with direction vector 104 and can be characterized as having predominantly vertical magnetic components (assuming for this convention an "xy" axis as shown) in which vertical component direction $θ_v$ associated with portion 110 is essentially parallel to magnetic vector 104. Portion 112, on the other hand, can be characterized has having predominantly horizontal magnetic components corresponding to portions of magnetic field lines 106 and 108 that have a horizontal component direction $θ_h$ that is generally perpendicular to magnetic vector 104.

As well known in the art, magnetic flux (denoted Φ) through a surface is the surface integral of the normal component of the magnetic field H passing through that surface and magnetic flux density (in units of Tesla, or T) is defined as an amount of magnetic flux through a unit area taken perpendicular to the direction of the magnetic flux. The magnetic flux density in portion 110 changes rapidly as a function of lateral distance "d" from a centerline of magnetic element 100. Accordingly, conventional approach to placement of magnetic sensors that rely upon magnetic flux density (such as a Hall Effect sensor) for detection of a magnetic field corresponds to the magnetic sensor positioned within the lateral distance "d" from the centerline of magnetic element 100 and be able to detect a magnetic field in accordance with a magnetic field detection axis (described below) that is generally oriented parallel to magnetic vector 104. In this way, the magnetic sensor is exposed to and detects predominantly that portion of magnetic field 102 formed of vertical magnetic field components. Accordingly, since most magnetic sensors rely on detection of magnetic flux density, a magnetic sensor that relies upon vertical magnetic components associated with portion 110 for detection can only have a limited range of use since 1) the magnetic flux density in portion 110 falls off rapidly as a function of lateral displacement from the centerline of magnetic element 100, and 2) a magnetic sensor that relies upon vertical magnetic components must therefore be placed as close to the centerline of magnetic element 100 as possible to avoid the rapid fall-off of magnetic flux density. Moreover, due to the critical placement of a magnetic sensor within the narrow "sweet spot" associated with region 110 and the symmetry of magnetic field 102, a magnetic sensor will not detect a change in direction $θ_v$ when magnetic element 100 is rotated 180° about the magnetic sensor and is therefore unable to determine when or even if such a change has occurred. In other words, this lack of "directionality" forces system designers to rely on multiple magnetic sensors to be able to detect such a movement of magnetic element 100. On the other hand, since region 112 is located away from any magnetic sources or sinks associated with magnetic element 100, horizontal magnetic components in region 112 are relatively stable and do not vary greatly and therefore offer a much greater range of placement of the magnetic sensor with respect to magnetic element 100.

Turning now to FIG. 1B showing graph 150 as a graphical representation of properties of magnetic field 102. More specifically, graph 150 shows a spatial relationship of horizontal magnetic component ($H_{comp}$) vs. lateral distance from centerline of magnetic element 100. As shown, region I corresponds to the proportion of magnetic field 102 that can be characterized as being predominantly vertical in nature (i.e., horizontal component is essentially zero, or very close thereto at about x=0 corresponding to a central portion of region 110). Moving away from the centerline (x=0), the proportion of magnetic field 102 having horizontal components increases until about x="d" at which point magnetic field 102 can be considered predominantly horizontal in nature corresponding to region II. As can be seen, as the lateral distance (x) increases beyond distance "d", magnetic field 102 begins to exhibit a magnetic flux density formed of predominantly horizontal magnetic components that is relatively constant within region II. It is this relative stability of magnetic flux density within and the size of region II that provides the advantages to utilizing region II for magnetic detection. Accordingly, a system designer has a much greater latitude in designing a system and utilizing limited space within an enclosure more efficiently since the magnetic sensor can be placed anywhere within region II. More specifically, by providing that a magnetically active portion of the magnetic sensor is oriented generally perpendicular to and laterally displaced from the magnetic element, the magnetic sensor can detect predominantly horizontal components. The detection of the horizontal components can, in turn, be used to determine a location of the magnetic element with regards to the magnetic sensor.

Figure 2:
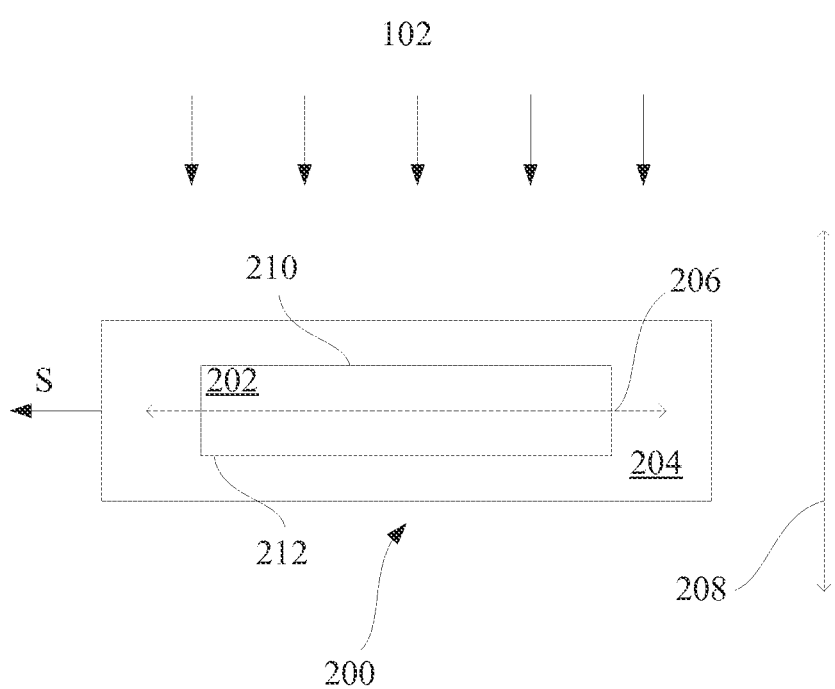
FIG. 2 shows a cross section of representative magnetic sensor in accordance with the described embodiments.

FIG. 2 illustrates magnetic sensor 200 in accordance with the described embodiments. Magnetic sensor 200 can take many forms at least one of which is a Hall Effect (HFX) sensor. As generally known, the HFX sensor relies upon the interaction between magnetic field 102 and charge conductors within magnetically active region 202 supported by sensor body 204 having an orientation defined by sensor orientation axis 206. In particular, when magnetically active region 202 generally aligns with sensor orientation axis 206, magnetic sensor 200 is most sensitive to detection of magnetic field lines that are parallel to magnetic detection axis 208 (and therefore generally perpendicular to magnetically active region 202). Accordingly, when magnetic sensor 200 is a HFX sensor, magnetic field 102 can interact with moving charge conductors in magnetically active region 202 inducing a voltage that corresponds to both a magnitude of the detected magnetic field (voltage level) and a direction of the detected magnetic field (voltage polarity) that can be embodied as output signal S. Accordingly, magnetic sensor 200 can provide a signal that can include information used to indicate a direction of the magnetic field 102 with respect to magnetically active region 202 and therefore provide an indication of a relative position of magnetic element 100 with respect to magnetic sensor 200. For example, when magnetic field 102 is impinging at surface 210 of magnetically active region 202, then magnetic field 102 will cause the moving electrical conductors to move in a first direction (conventionally based upon the "right hand rule") that can be associated with output signal S corresponding to a first voltage polarity V1. However, when magnetic field 102 is impinging at surface 212 of magnetically active region 202, then the moving electrical conductors will move in a second direction opposite the first direction giving rise to output signal S corresponding to a second voltage polarity V2 opposite to that of first voltage polarity V1. In this way, the direction of magnetic field 102 at magnetic sensor 200 can be determined by direct evaluation of output signal S and as a result a direct determination of a position of magnetic element 100 with respect to magnetic sensor 200.

FIG. 3 shows enclosure 300 arranged to carry magnetic sensor 200 in accordance with the described embodiments. Enclosure 300 can be formed of non-magnetic material by which it is meant that enclosure 300 is essentially transparent to magnetic field 102 and therefore does not affect either the orientation or magnetic field strength of magnetic field 102. For example, enclosure 300 can be formed (entirely or in relevant part) of non-magnetic metals such as aluminum, or polymers, or ceramics, or other such material having the desired non-magnetic properties. Enclosure 300 can include wall 302 having surface 304 and surface 306 that are generally parallel to each other. Wall 302 can be configured to define internal volume 308 that can be used to accommodate sensor 200 such that sensor orientation axis 206 is generally perpendicular to surfaces 302 and/or 306 and therefore that magnetic detection axis 208 is parallel to surfaces 304 and 306. This orientation can accomplished by, for example, mounting sensor body 204 generally perpendicular to either surface 304 or 306 and at least a distance "d" laterally displaced from an expected position of magnetic element 100 at surface 304. In this example, magnetic element 100 is oriented perpendicular to surface 304 (as evidenced by magnetic vector 104). Accordingly, by appropriately orienting and positioning magnetic sensor 200 within volume 308, magnetic sensor 200 can be operably located within region II of magnetic field 102 such that magnetic sensor 200 is primarily detecting horizontal components of magnetic field 102 and as such, can provide an indication of a direction of the horizontal magnetic field components (corresponding to a relative position of magnetic element 100 with respect to magnetic sensor 200) that can be associated with output signal S1.

Figure 3A:
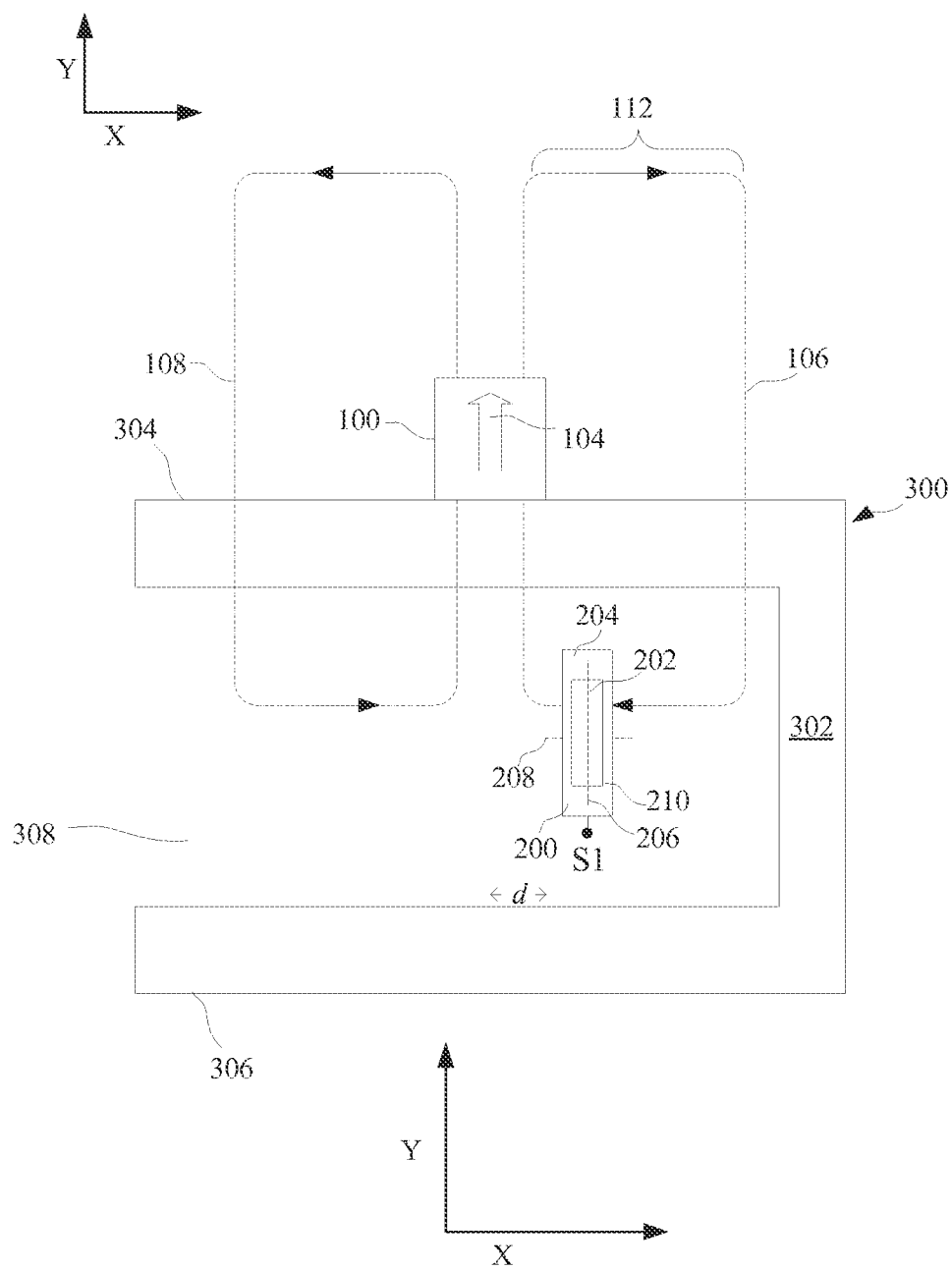
FIGS. 3A and 3B shows magnetic interaction between a magnetic element and a magnetic sensor.

For example, magnetic field line 106 (or more precisely, horizontal components of magnetic field 102 corresponding to Region II) impinges surface 210 of magnetically active region 202. The interaction between magnetic field 102 and magnetically active region 202 at surface 210 can infer direction of magnetic field 102 that can, in turn, be associated with an output signal embodied as output signal S1. Evaluation of output signal S1 can therefore be used to specifically identify surface 304 as a current location of magnetic element 100 as shown in FIG. 3A. Accordingly, operating components (not shown) carried by enclosure 300 (as part of an electronic device, for example) can receive output signal S1 and determine that magnetic element 100 has a current location corresponding to surface 304 and act accordingly.

Figure 3B:
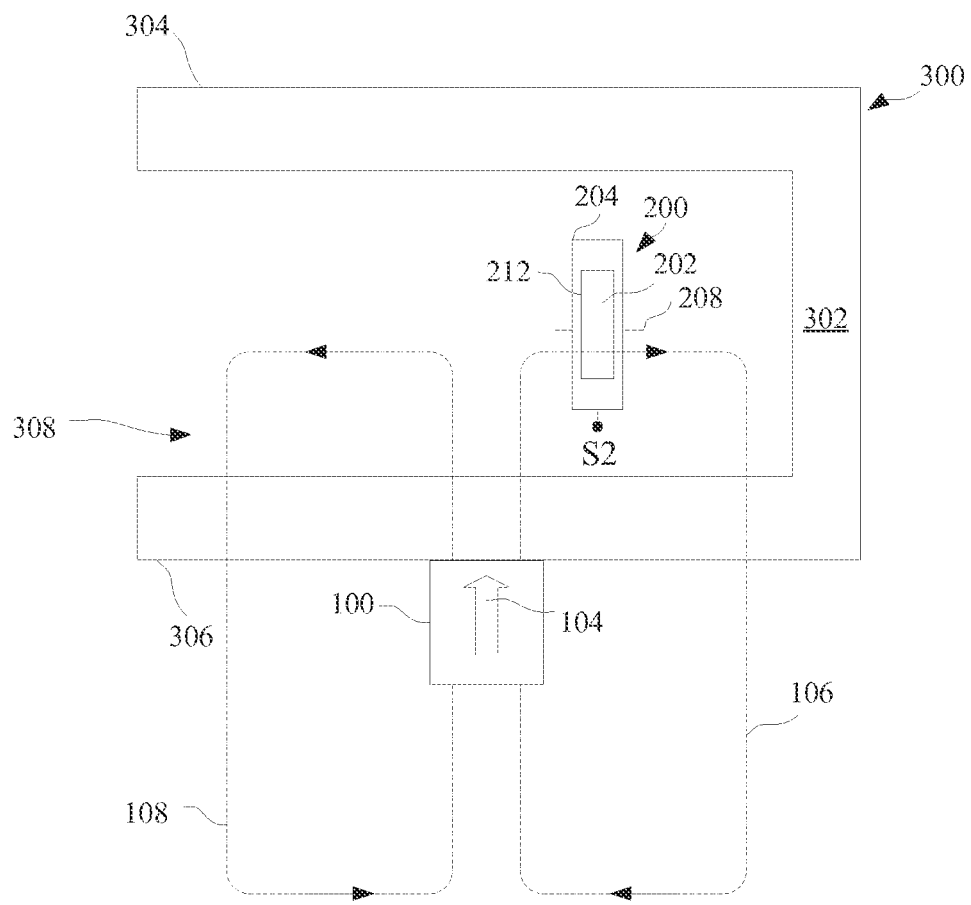

Turning now to FIG. 3B illustrates a situation where a current location of magnetic element 100 is flipped about enclosure 300 such that magnetic vector 104 is perpendicular to surface 306 and yet retains the same direction as previous (i.e., in FIG. 3A, magnetic vector points away from surface 304 in a +Y direction whereas in FIG. 3B, magnetic vector 104 still points in the +Y direction but now is pointing towards surface 306). Accordingly, magnetic field line 106 now impinges surface 212 of magnetically active region 202 causing magnetic sensor 200 to provide output signal S2. Output signal S2 can be processed and evaluated in such a manner that the current location of magnetic element 100 can be specifically identified as surface 306.

Figure 4A:
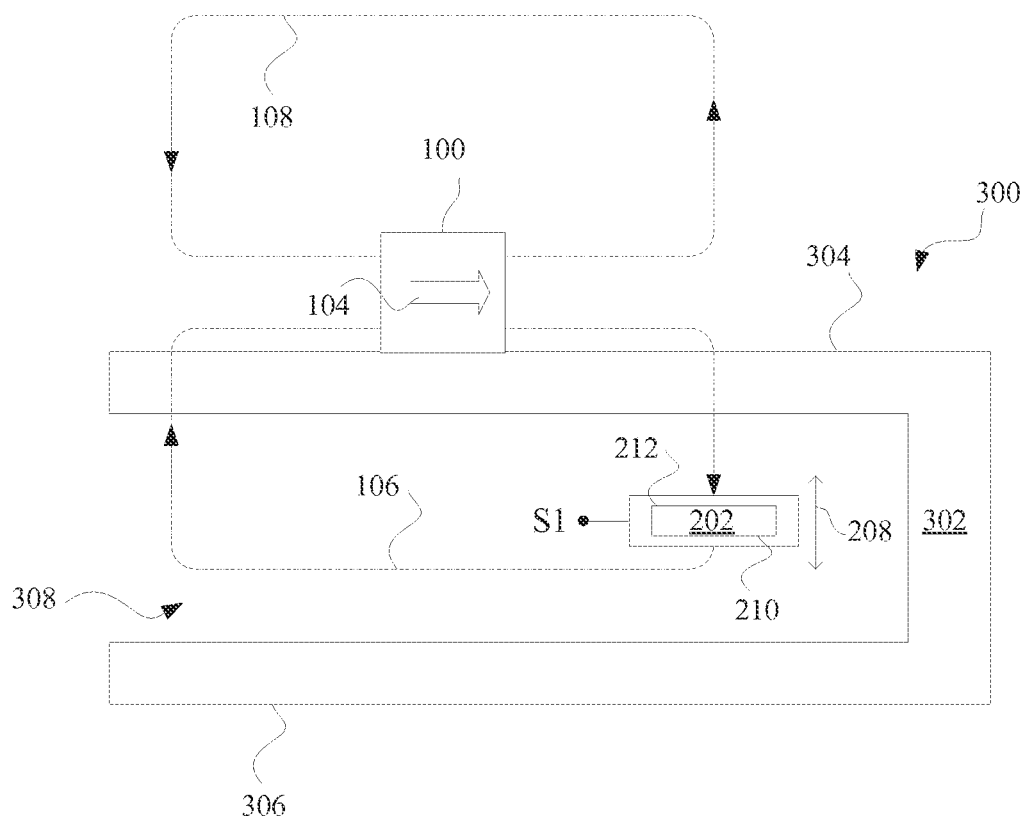
FIGS. 4A and 4B shows magnetic interaction between a laterally polarized magnetic element and a magnetic sensor.
Figure 4B:
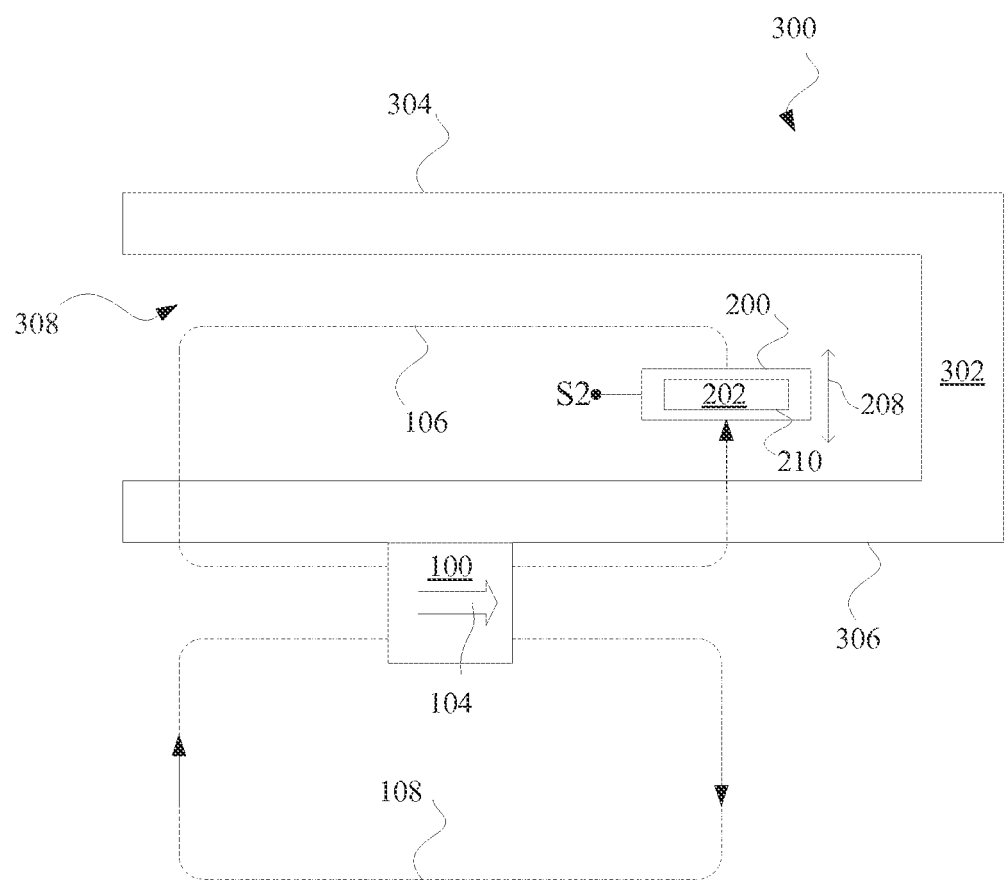

FIGS. 4A and 4B show implementation 400 of the described embodiments whereby magnetic element 100 is rotated 90° with respect to surfaces 304 and 306 such that magnetic element is at surface 304 and magnetic vector 104 is parallel to surface 304 (as shown in FIG. 4A) and magnetic element 100 is at surface 306 and magnetic vector 104 is parallel to surface 306 (as shown in FIG. 4B). In this arrangement, magnetic sensor 200 can be carried by enclosure 300 in such a way that sensor orientation axis 206 is parallel to surfaces 304 and 306 thereby rendering magnetic detection axis 208 perpendicular to surfaces 304 and 306 (as well as magnetic vector 304). Accordingly, magnetic sensor 200 can be operably located within Region II of magnetic field 102 and as such can be capable of detecting horizontal components associated with magnetic field line 106. More specifically, in FIG. 4A, magnetic field line 106 impinges surface 212 of magnetically active region 202 causing magnetic sensor 200 it provide output signal S1 that can (as described above with respect to FIG. 3A) be used to determine that magnetic element is currently located at surface 304. Conversely, as shown in FIG. 4B, magnetic element 100 is located at surface 306 and can be detected by magnetic sensor 200 where magnetic field line 106 impinges surface 212 of magnetically active region 202 providing output signal S2.

It should be noted, that magnetic element 100 can also be laterally polarized in that magnetic vector 104 is generally perpendicular to an axis corresponding to a geometric shape of magnetic element 100 that also defines a spatial orientation of magnetic element 100 with respect to magnetic sensor 200. For example, magnetic element 100 can take the general form of a cylinder having a corresponding longitudinal axis that defines the geometric shape and spatial orientation of magnetic element 100. However, when magnetic element 100 is laterally polarized, then magnetic vector 104 is orthogonal to the longitudinal axis and as such will determine the relative orientation and placement of magnetic sensor 200. Accordingly, in some embodiments, an electronic device can have two magnetic sensors, one for detection of magnetic elements having orthogonal orientations with respect to each other.

Figure 5A:
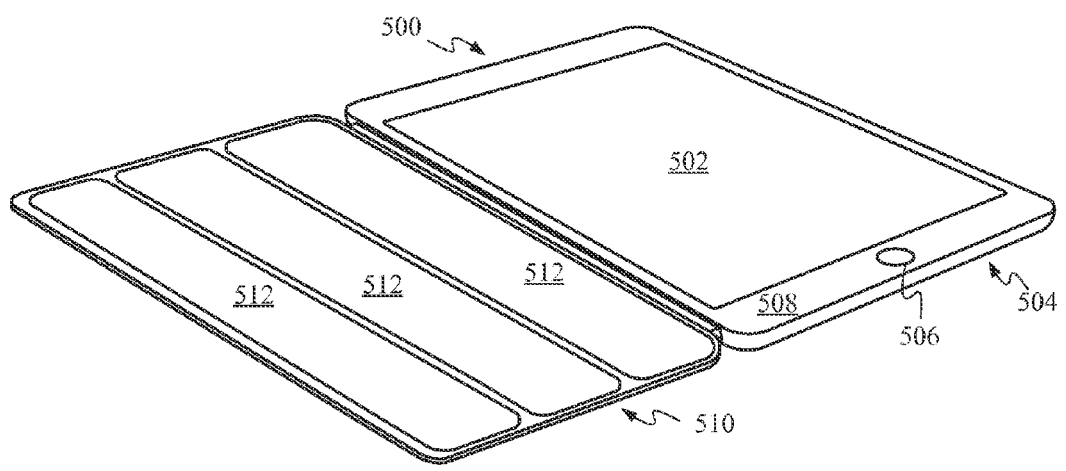
FIG. 5A shows an exemplary electronic device.

FIG. 5A shows an exemplary electronic device 500. As depicted, electronic device 500 can take the form of a tablet device. In some embodiments, electronic device 500 can include display assembly 502 positioned within a housing 504. Housing 504 can be formed of any number of substantially rigid materials along the lines of aluminum, plastic, or other non-magnetic material and can provide protection for various internal components disposed within housing 504. In some embodiments, electronic device 500 can include any number of user interface elements including for example button 506 that extends through protective cover 508, which overlays and provides protection for display assembly 502. In some embodiments, display assembly 502 can provide another means of controlling and manipulating content presented by electronic device 500. For example, a touch sensitive sensor can overlay display assembly 502 and allow a user of electronic device to directly manipulate objects appearing upon display assembly 502. Electronic device 500 can include various other features such as additional buttons and switches as well as I/O ports for interacting and exchanging data with electronic device 500 and other electronic devices or peripherals.

Figure 5B:
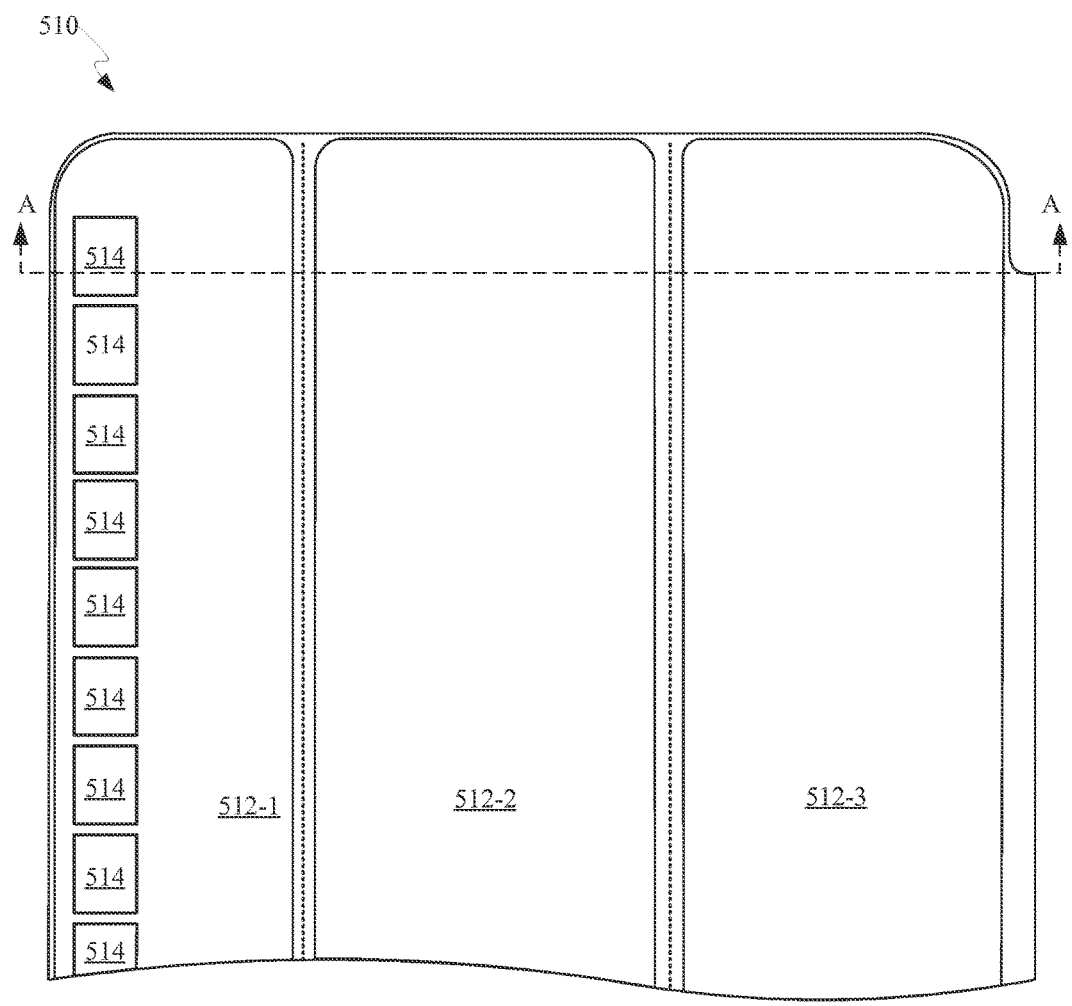
FIG. 5B shows a close up view of an upper portion of accessory device shown in FIG. 5A.

FIG. 5B depicts accessory device 510 which can be pivotally coupled with electronic device 500 to take the form of a consumer electronic product. In some embodiments, electronic device 500 can be coupled to accessory device 510 by way of a number of magnets. In some embodiments, accessory device 510 can take the form of a flexible flap having a number of segments 512 that assist in shaping the accessory device into any one of a number of support configurations. Segments 512 can also be configured to allow a user of electronic device 500 to uncover a predetermined amount of display assembly 502. For example, when accessory device 510 completely overlays protective cover 508, folding back a first one 512-1 of segments 512 can uncover a corresponding amount of display assembly 502. Furthermore, folding back of accessory device 510 completely around electronic device 500 so at least one of segments 512 is in contact or near contact with a rear portion of housing 504. In some embodiments, electronic device 500 can be configured to display content only on those portions of display assembly 502 that are uncovered.

FIG. 5B also shows magnets 514 (indicated by solid rectangular boxes) arranged within accessory device 510. In some embodiments, the magnetic field emitted by magnets 514 can be operable to secure a portion of accessory device 510 against protective cover 308. Magnets 514 can be arranged in any manner suitable for the intended use. For example, magnets 514 can be arranged in a magnetic string formation in which each of magnets are linearly disposed with respect to one another. In some embodiments, the linear disposition just means that a line can be drawn through at least a portion of each of the magnets in the magnetic string. For example, some of magnets 514 can be shifted laterally to optimize a shape and/or size of the magnetic field emitted by magnets 514. In some embodiment, a magnetic field emitted by magnets 514 can be customized by the way magnets 514 are magnetized. In some embodiments, magnets 514 can be arranged in such a way that the individual magnetic elements can be arranged in an alternating magnetic polarity pattern (P1, P2, P1, P2 . . . ; where P1 represents a first polarity such as North and P2 represents a second polarity opposite that of P1 such as South). Magnets 514 can be equally spaced apart as well the spacing between the individual magnets can vary. Magnets 514 can be characterized as having about the same size, shape and mass. In other cases, the individual magnetic elements can vary in size, shape and mass or any combination thereof.

Figure 6A:
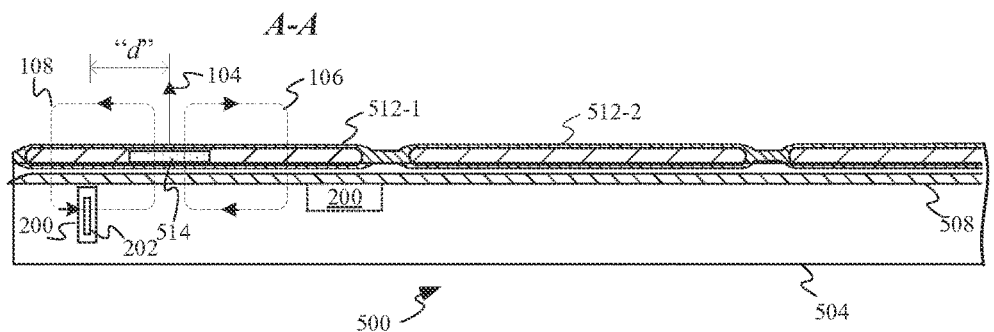
FIGS. 6A-6B show cross-sectional views of accessory device shown in FIG. 5B having a flap in accordance with Section Line A-A.
Figure 6B:
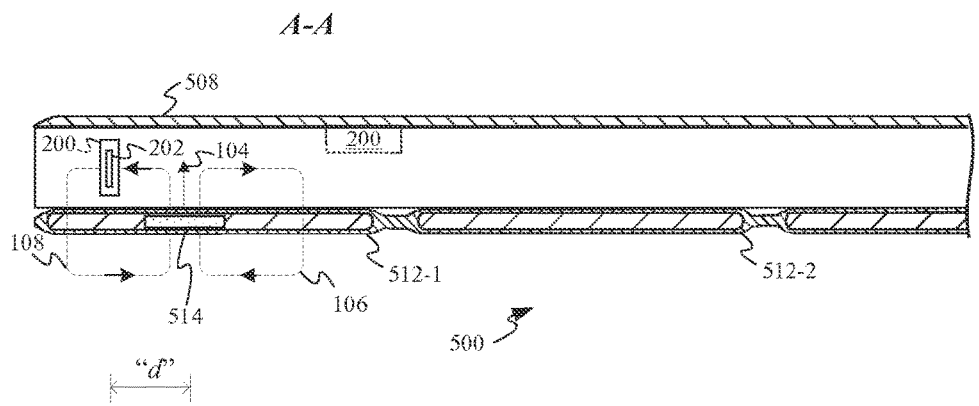

FIGS. 6A-6B show cross-sectional views of accessory device 510 having flap 512 in accordance with Section Line A-A of FIG. 5B. In FIG. 6A, accessory device 510 is in a closed configuration such that protective layer 508 is covered by flap 512. In this configuration, magnetic element 514 is detected by magnetic sensor 200. More particularly, magnetic sensor 200 can be laterally displaced from magnetic element 514 by at least distance "d". In this way, magnetic sensor 200 can sense horizontal magnetic components of magnetic field 102 provided by magnetic element 514 located at protective layer 508. In this configuration, magnetically active region 202 of magnetic sensor 200 detects horizontal magnetic component of magnetic field 102 at surface 210 and responds by generating signal S1 that can be used to indicate that a current location of magnetic element 514 is at protective layer 508 and by inference that cover 514 is in the closed configuration. In this way, electronic device 500 can operate in accordance with protective layer 508 (and display 502) being fully covered by accessory device 510. It should also be noted that alternatively, or in addition to, magnetic sensor 200 (shown in dotted line format) can be oriented parallel to protective layer 508. In this way, in magnetic sensor 200 can detect horizontal magnetic components of magnetic field 102 when magnetic element 514 is either laterally polarized or oriented in such a way that magnetic vector 104 is parallel to protective layer 508.

FIG. 6B shows a second configuration where flap 512 is rotated to a rear portion of housing 504 where magnetic sensor 200 can detect horizontal magnetic component at surface 212. In this way, magnetic sensor 200 can provide a single S2 in accordance with a direction of the detected horizontal component. For example, with regards to FIG. 6A, detection of horizontal component of magnetic field 102 at surface 210 can have first direction vector that can be associated with a first signal and detection of horizontal component at surface 212 having second direction vector as in FIG. 6B can be associated with a second signal. In this embodiment, the first and second signals can be associated with a positional relationship between magnetic element 514 and magnetic sensor 200.

Permanent magnets have been widely used in consumer electronic devices (such as iPad, tablets, smart phones, laptops, etc.) and their accessories to provide various unique featured functions. For example, magnets in smart cover provide the attaching force with invisible magnetic fields, Hall effect sensor (HES) can determine the state of cover by detecting magnetic fields. Magnets have also been used in various components, such as, speakers, vibes, receivers, cameras, etc. There are many ways to characterize the magnetic flux density, such as using Hall effect sensor, magneto-optic sensor, magneto-resistor sensor, and sensor arrays based on these technology. However, none of these methods can characterize the actual surface flux density in large area on electronic devices for a number of reasons. First, these sensors are usually certain distance away from the surface and some magnetic arrays are limited to small area due to the availability of sensor material, or the complexity of circuit.

Accordingly, a method is described that can be used to characterize the surface magnetic flux density by, for example, correlating available finite element analysis (FEA) results and measured flux density on a plane at certain distance away and interpolating/extrapolating the surface flux density accordingly. In one embodiment, a measurement of an actual flux density $C_{ref}$ on a reference surface located a specific distance "t" away from the electronic device and at a surface of interest of the electronic device. With simulation software, the maximum flux densities at the reference surface ($B_{refl}$) and a surface of interest ($B_{surfl}$) can be simulated with a degree of accuracy. Therefore, the flux density on the surface ($C_{surf}$) can be evaluated in accordance with equation (1):

$$C_{surf} = (B_{surfl}/B_{refl}) \times C_{ref} \quad \text{Eq. (1)}.$$

This method also provides a good estimate of flux density distribution. Moreover, in order to improve the accuracy, flux densities on planes located at different distances away from the surface can be measured and simulated. This method can also be used to characterize surface flux density on surfaces with complicated curvatures or profiles. This particular approach has at least the following advantages:
(1) surface flux density can be characterized for surfaces with simple or complicated curvature profile;
(2) apriori knowledge of magnet quality or performance is not required;
(3) can be used to characterize the flux density on any surface, or planes with any distance to the surface; and
(4) can be used to quantitatively relate designed magnet to real flux density.

Figure 7:
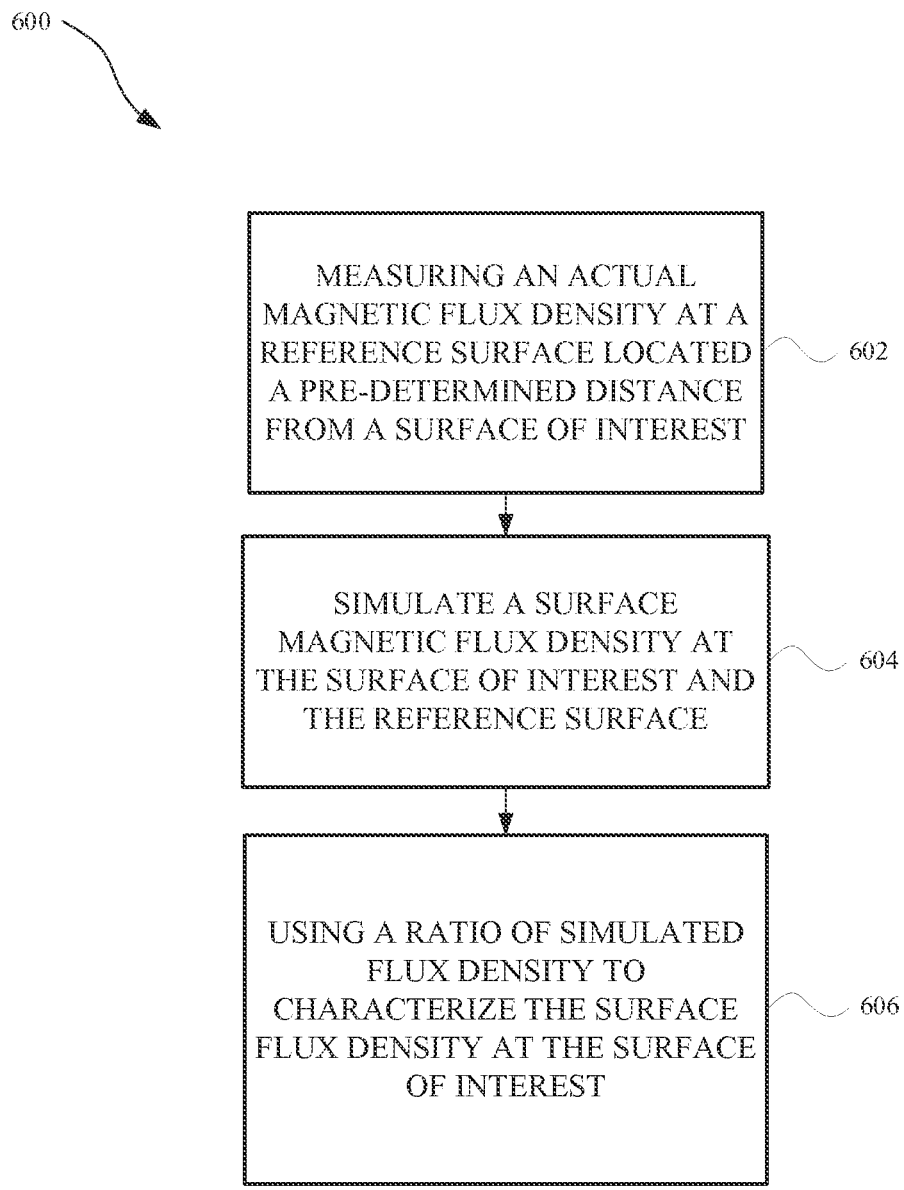
FIG. 7 shows a flow chart describing process for characterizing a surface magnetic flux density for any arbitrary magnetic element.

FIG. 7 shows a flow chart describing process 600 for characterizing a surface magnetic flux density for any arbitrary magnetic element. Process 600 can begin at 602 by measuring an actual magnetic flux density corresponding to a reference surface located a predetermined distance from the surface of interest for which the surface magnetic flux estimate is desired. Next at 604, a simulation (using finite element analysis, for example) of the surface magnetic flux is obtained at both the surface of interest and at the reference surface. At 606, the flux density at the surface of interest can be determined using upon ratio of simulated magnetic flux density at the reference surface and the surface of interest to scale the actual magnetic flux density measured at the reference surface in accordance with Eq. (1) above.

Figure 8:
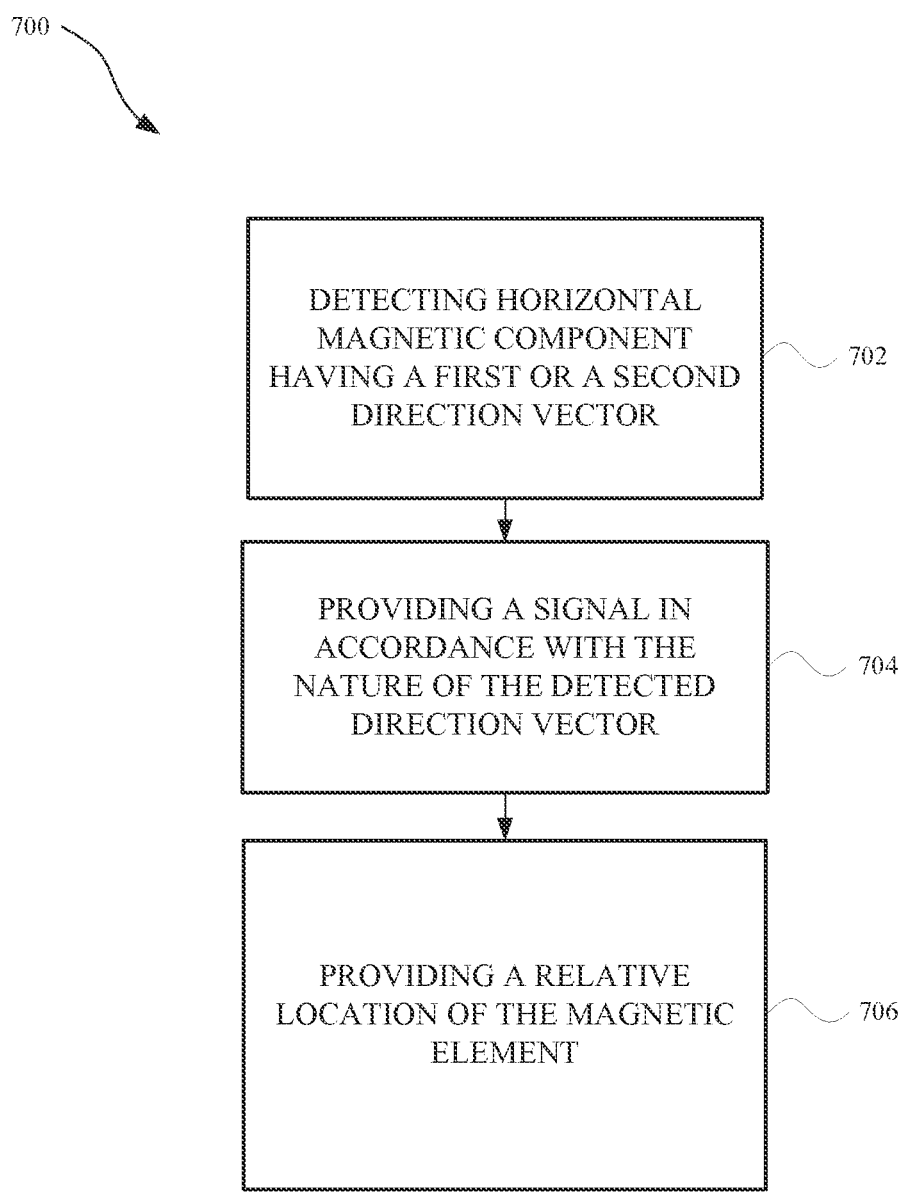
FIG. 8 shows a flowchart detailing process in accordance with the described embodiments.

FIG. 8 shows a flowchart detailing process 700 in accordance with the described embodiments. More particularly, process 700 can be used to determine a relative position of a magnet element with respect to a sensor. In particular, method 700 is well suited for use with an electronic device having a housing that carries the sensor (generally in the form of a Hall Effect Sensor) and an external magnet associated with an accessory device that can be moved about the housing that can, in turn, affect a manner in which the electronic device operates. Accordingly, process 700 can begin at 702 by a sensor carried by a housing of an electronic device detecting a horizontal magnetic component associated with a magnetic field generated by a magnetic element that is external to the housing. In one embodiment, the sensor provides a first signal at 704 indicating that the detected horizontal component is associated with a first direction vector indicating that the magnetic element (and the corresponding accessory element) is located at a first position with respect to the sensor or a second signal indicating that the detected horizontal component is associated with a second direction vector. At 706, a relative position of the magnetic element with respect to the sensor is determined based upon the nature of the signal.

Figure 9:
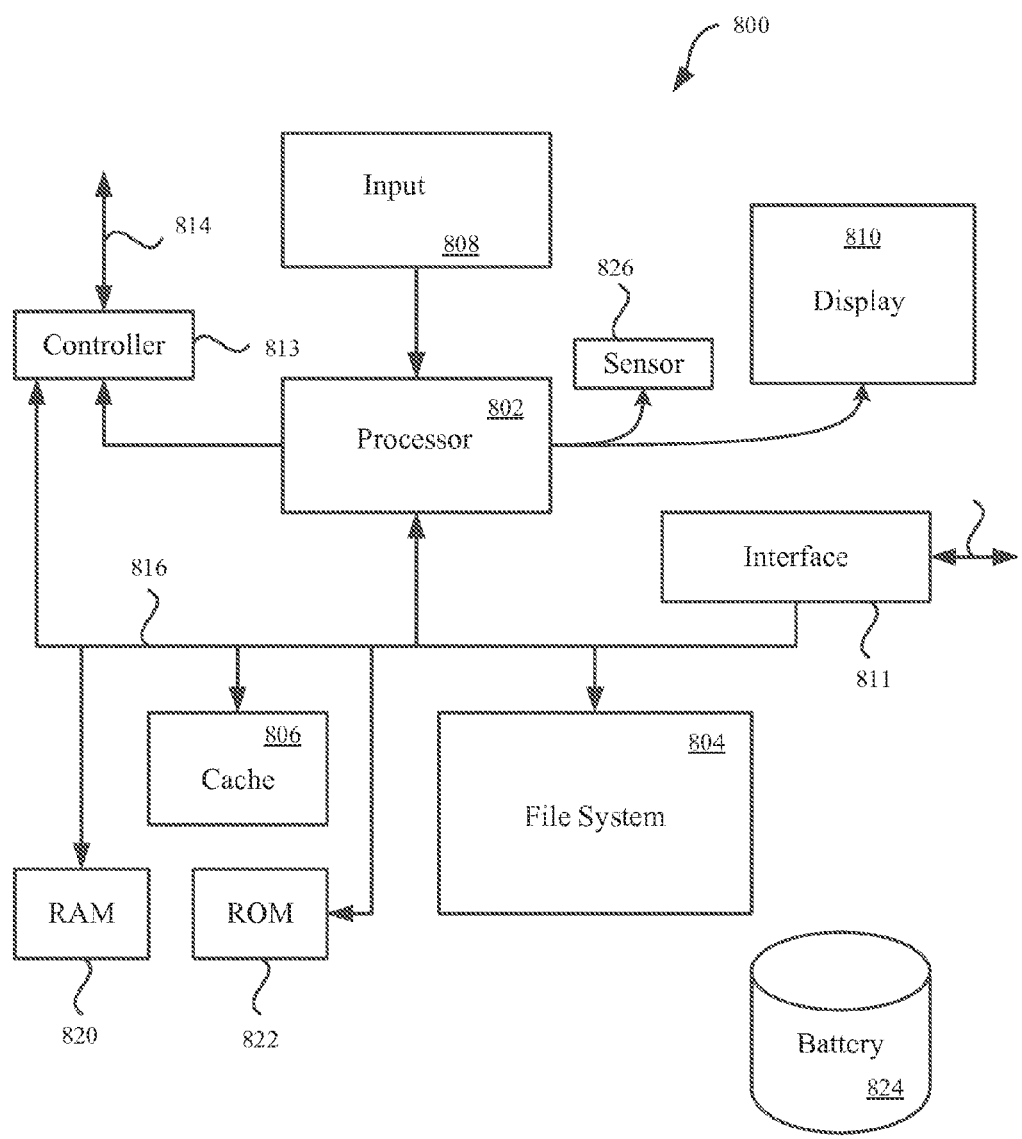
FIG. 9 is a block diagram of an electronic device suitable for controlling some of the processes in the described embodiment.

FIG. 9 is a block diagram of an electronic device suitable for controlling some of the processes in the described embodiment. Electronic device 800 can illustrate circuitry of a representative computing device. Electronic device 800 can include a processor 802 that pertains to a microprocessor or controller for controlling the overall operation of electronic device 800. Electronic device 800 can include instruction data pertaining to operating instructions in a file system 804 and a cache 806. File system 804 can be a storage disk or a plurality of disks. In some embodiments, file system 804 can be flash memory, semiconductor (solid state) memory or the like. The file system 804 can typically provide high capacity storage capability for the electronic device 800. However, since the access time to the file system 804 can be relatively slow, the electronic device 800 can also include cache 806. The cache 806 can include, for example, Random-Access Memory (RAM) provided by semiconductor memory. The relative access time to the cache 806 can substantially shorter than for the file system 804. However, cache 806 may not have the large storage capacity of file system 804. Further, file system 804, when active, can consume more power than cache 806. Power consumption often can be a concern when the electronic device 800 is a portable device that is powered by battery 824. The electronic device 800 can also include a RAM 820 and a Read-Only Memory (ROM) 822. The ROM 822 can store programs, utilities or processes to be executed in a non-volatile manner. The RAM 820 can provide volatile data storage, such as for cache 806.

Electronic device 800 can also include user input device 808 that allows a user of the electronic device 800 to interact with the electronic device 800. For example, user input device 808 can take a variety of forms, such as a button, keypad, dial, touch screen, audio input interface, visual/image capture input interface, input in the form of sensor data, etc. Still further, electronic device 800 can include a display 810 (screen display) that can be controlled by processor 602 to display information to the user. Data bus 816 can facilitate data transfer between at least file system 804, cache 806, processor 802, and controller 813. Controller 813 can be used to interface with and control different manufacturing equipment through equipment control bus 814. For example, control bus 614 can be used to control a computer numerical control (CNC) mill, a press, or other display devices. For example, processor 802, upon a certain manufacturing event occurring, can supply instructions to control an alternate display through controller 813 and control bus 814. Such instructions can be stored in file system 804, RAM 820, ROM 822 or cache 806.

Electronic device 800 can also include a network/bus interface 811 that couples to data link 812. Data link 812 can allow electronic device 800 to couple to a host computer or to accessory devices. The data link 812 can be provided over a wired connection or a wireless connection. In the case of a wireless connection, network/bus interface 811 can include a wireless transceiver. Sensor 826 can take the form of circuitry for detecting any number of stimuli. For example, sensor 826 can include any number of sensors for monitoring such as, for example, a Hall Effect sensor responsive to external magnetic field, an audio sensor, a light sensor such as a photometer and so on.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. An electronic device, comprising:
   a housing having an external surface; and
   a magnetic sensor capable of detecting a magnetic field from a magnetic element in accordance with a magnetic sensor detection axis, the magnetic sensor carried by the housing generally perpendicular to the external surface such that the magnetic sensor detection axis is generally parallel to the external surface, and based upon the detecting, provides a signal that is used to identify that the external surface is between the magnetic sensor and the magnetic element.

2. The electronic device as recited in claim 1, wherein the external surface is a first surface and the housing further comprising a second surface that is generally parallel to the first surface.

3. The electronic device as recited in claim 2, wherein the housing further carries a processor capable of communication with the magnetic sensor and that uses the signal to alter an operation of an electronic component carried by the housing.

4. The electronic device as recited in claim 2, wherein when the signal is a first signal, the first surface is between the magnetic element and the magnetic sensor, otherwise, the signal is a second signal and the second surface is between the magnetic element and the magnetic sensor.

5. The electronic device as recited in claim 1, wherein the magnetic sensor is mounted to a printed circuit board carried by the housing.

6. The electronic device as recited in claim 1, wherein the magnetic field comprises a vertical component and a horizontal component that is generally parallel to the magnetic detection axis and perpendicular to the vertical component.

7. The electronic device as recited in claim 6, wherein the horizontal component is generally detectable by the magnetic sensor when the vertical component is perpendicular to the external surface and the magnetic element is laterally displaced from the magnetic sensor.

8. The electronic device as recited in claim 6, wherein the signal is based upon a direction of the horizontal component detected by the magnetic sensor.

9. The electronic device as recited in claim 1, wherein the magnetic sensor is a dual output Hall Effect sensor.

10. A method operable by an electronic device having a housing with a first surface that is generally parallel to a second surface, comprising:
    detecting a magnetic field provided by a magnetic element by a magnetic sensor in accordance with a magnetic sensor detection axis, the magnetic sensor being carried by the housing such that (i) the magnetic element is laterally displaced from the magnetic sensor, and (ii) the magnetic sensor detection axis is generally parallel to the first and second surfaces and perpendicular to an orientation of the magnetic element; and
    providing, by the magnetic sensor in response to the detecting, a signal comprising:
    a first detection signal that identifies that the first surface is between the magnetic sensor and the magnetic element, otherwise, a second detection signal that identifies that the second surface is between the magnetic sensor and the magnetic element.

11. The method as recited in claim 10, wherein the electronic device operates in accordance with the signal.

12. The method as recited in claim 10, wherein the magnetic sensor is capable of tracking movement of the magnetic element between the first and second surfaces.

13. The method as recited in claim 10, wherein when the magnetic element is laterally polarized, the magnetic sensor is carried by the housing such that the magnetic sensor detection axis is perpendicular to the first and the second surfaces.

14. The method as recited in claim 10, wherein the magnetic element is carried by a flap pivotally attached to the electronic device such that the flap is capable of positioning the magnetic element at the first surface in a first configuration and the second surface in a second configuration.

15. The method as recited in claim 14, further comprising:
    in accordance with detection by the magnetic sensor,
    operating the electronic device in a first configuration mode in accordance with the magnetic element being positioned by the flap at the first surface; and
    operating the electronic device in a second configuration mode in accordance with the magnetic element being positioned by the flap at the second surface.

16. A consumer product system, comprising:
    an electronic device comprising a housing arranged to carry operational components and having a front portion and a rear portion opposite the front portion, the operational components comprising:

a magnetic sensor mounted perpendicular to the front and rear portions and operable to detect a magnetic field provided by a magnetic element, the magnetic element being generally detectable when a current location of the magnetic element is laterally disposed from the magnetic sensor and corresponds to a position (i) on or near the front portion, or (ii) on or near the rear portion; and a flap that is capable of being removably attached to the electronic device in a manner that allows the flap to pivotally move with respect to the housing.

17. The consumer product system as recited in claim 16, in a first configuration, the flap covers at least some of the front portion of the housing and in a second configuration, the flap covers at least some of the rear portion of the housing.

18. The consumer product system as recited in claim 17, wherein the flap carries the magnetic element such that in the first configuration the magnetic element is located at a first position that allows detection of the magnetic element by the magnetic sensor and in the second configuration the magnetic element is located at a second position that allows detection of the magnetic element by the magnetic sensor.

19. The consumer product system as recited in claim 18, wherein the magnetic sensor provides information corresponding to a current configuration of the flap based upon the detection of the magnetic element at the first or the second position.

20. The consumer product system as recited in claim 16, wherein the magnetic sensor detects the magnetic field in accordance with a magnetic sensor detection axis that is generally parallel to the front and rear portions when the magnetic sensor is mounted perpendicular to the front and rear portions.

* * * * *